3,777,038
BAKING PROCESS AND COMPOSITIONS
FOR ITS PRACTICE
Jerome B. Thompson, Rte. 3, Box 231,
Cumberland, Md. 21502
No Drawing. Continuation-in-part of abandoned application Ser. No. 81,560, Oct. 16, 1970. This application Feb. 12, 1973, Ser. No. 331,882
Int. Cl. A21d 2/04, 2/22, 2/24
U.S. Cl. 426—19                                    18 Claims

ABSTRACT OF THE DISCLOSURE

Iron chelates of ethylenedinitrilotetraacetate, ferrous or ferric, are incorporated in the dough mass used in the production of yeast leavened baked products made from wheat flour to improve the dough as well as the baked products obtained therefrom. Such chelates are introduced into the dough mass, as such, or by forming them in situ by the introduction of iron salts and ethylenedinitrilotetraacetates which react in the presence of dough water to form such chelates. The effect of the chelates will be found to be materially enhanced by having present therein activating traces of bromate ions therewith, the amount of bromate being about 10% to 20% of the amount that has generally been employed heretofore in the production of baked products. Thus, the amount of bromate to be employed in the practice of the present invention will be in the range of about .0001% to about .003% based on the weight of the flour.

RELATED APPLICATION

This application is a continuation-in-part of my application Ser. No. 81,560, filed Oct. 16, 1970 and which is now abandoned.

BACKGROUND OF THE INVENTION

Millers and bakers have used a variety of processes to enhance the performance of flours in their intended use for making bread or other yeast leavened products. Millers use a number of improvers or maturing agents; the common ones are chlorine dioxide, benzoyl peroxide, azodicarbonamide and potassium bromate. All are potent oxidizing agents which have random chemical effects on organic materials.

For their improving process, bakers usually employ potassium bromate and, to a lesser extent, potassium iodate and calcium peroxide. These agents, which also are oxidizers, are generally but not invariably compounded as mixtures with a variety of acidulants, buffers and other salts with inert fillers. These are called yeast foods or dough conditioners.

The levels at which these improving agents are applied to flour and flour doughs depends upon a large number of factors, including the characteristics of the individual flour, the products to be made from it and the baking processes that will be employed. However, in general the materials will be employed generally in the range of 15-150 parts per million of flour. The level for optimum benefit to the performance of a given flour is critical, but even this optimum level gives a flour performance which is less than its potential because the oxidizers, being random in action, simultaneously cause some damage. Overoxidation, treatment beyond optimum, and damage to the unique gluten protein has disastrous effects on the baking performance of a flour. Much effort has been expended to control these improving processes.

All these oxidants are used in the United States but in many countries statutory regulations prohibit them or drastically curtail their use. In these countries having such regulations ascorbic acid is used as the improver both in flour and dough. The ascorbic acid has improving effects at the 15–75 p.p.m. level of application which are similar in degree, but differing in kind from those effects obtained by the use of the oxidizers. Ascorbic acid has also the advantages that its usage levels are less critical since overtreatment does not cause serious damage to wheat proteins and their baking properties, and the material as vitamin C is nutritionally desirable. Oddly, ascorbic acid is a reducing agent.

SUMMARY OF THE INVENTION

The present invention is concerned with a process for the manufacture of improved yeast leavened baked products made from wheat flour through the inclusion in the dough mass from which these products are made of an iron chelate of an ethylenedinitrilotetraacetate or through the inclusion of iron salts of ethylenedinitrilotetraacetates which can react in the presence of the dough water to form such chelates. The invention is also concerned with compositions which are useful in such process. Further, in the practice of the present invention, only about 10 to 20% of the amount of potassium bromate or other functionally equivalent bromate normally added will be required when the chelate is employed therewith. Thus, in the preferred embodiment of the present invention the amount of bromate present will be about .0001% to about .003% by weight based on the weight of the flour, or 1 to 30 parts per million of flour.

DETAILED DESCRIPTION OF THE INVENTION INCLUDING PREFERRED EMBODIMENTS

The process according to the invention is accomplished by the inclusion, in doughs from which yeast leavened bread or baked goods are made, of iron chelates wherein the iron may be in either the ferrous or ferric states of oxidation and the ligand is derived from ethylenedinitrilotetraacetic acid or its salts. These chelates which contain nutritionally available iron may also be introduced as precursors which react in solution to form the active compounds. Through the application of this process wheat flours are improved for their intended purposes and baked products are improved. With the present invention, wheat flour will require only a fraction of the amount of potassium bromate normally required as an improver, i.e., 10% to 20% of the amount heretofore employed. The flours will be found to be improved for their intended purposes and the baked product from them will be improved. Doughs made using this process are more machinable, and more gas retentive; they yield baked products of improved volume, appearance externally and internally, and with a crumb of finer grain and texture. These baked goods are improved as to acceptability as foods. The functional iron chelates employed are actually complex anions in which the iron, either the F(II) or Fe(III) form is tightly bound to the ligand derived from ethylenedinitrilotetraacetic acid or its salts. By acceptance, coordination chemists refer to them as FeEDTA$^{-2}$ for the ferrous chelate and FeEDTA$^{-1}$ for the ferric. The cations associated with these anions are usually sodium but could be hydrogen, potassium, ammonium or other physiologically innocuous cation.

These iron chelates are known and readily obtained or prepared, normally, as sodium salts. The sodium ferrous ethylenedinitriolotetraacetate, called sodium ferrous edetate or Na$_2$FeEDTA, is a tan crystalline powder with an iron content of 14.3%. The sodium ferric ethylenedinitrilotetraacetate, called sodium ferric edetate of NaFeEDTA is a yellowish crystalline powder with an iron content of 15.3%. These compounds are used in the treatment of iron deficiency anemia and as a source of iron in plant foods.

The process may also be practiced by the inclusion of the iron, as a soluble salt and a source of the ligand in the dough mass where the active chelates will be formed in situ.

Iron salts which are available, conveniently handled and have physiologically acceptable anions are desired. Practically, the iron sulfates and chloride are preferred.

Tetrasodium ethylenedinitrilotetraacetate, known as sodium edetate and a great number of trade names, is a common chemical. It may be converted readily to the acid which is slightly soluble in water and the acid can be reacted with the proper ratios of the tetrasodium salt to form the mono-, di- or trisodium salts. It can also be neutralized completely or partially with appropriate bases to form salts of other cations. One such mixed salt, calcium disodium edetate, is used in foods as a scavenger of trace metals.

All these foregoing materials may serve as sources of the ligand used in this process.

In the instant process all of the benefits of the oxidative treatments previously employed are obtained with reduced risk of damage to the baking properties of the flour by overtreatment. The ferrous or ferric chelates of ethylene-dinitrilotetraacetates are introduced into the dough batch with the flour or a number of other equally effective routes. The level for maximum improvement is very small, generally 10–200 parts per million of flour, that is, in concentrations of .001% to .02%. The maximum improvement is generally better than the optimum accomplished by the traditional treatments apparently because the induced oxidation is not random.

The amount of bromate to be employed will be at a level that is only 10% to 20% of the amount normally required for optimum oxidation. The maximum improvement in dough and baked product characteristics with this particular embodiment is generally better than the optimum results achieved by the traditional treatments because the oxidation induced by this process is not random. An important difference is that excess chelate does absolutely no harm to the baking properties of the flour and the effects of the small amount of bromate used are not noticeably deleterious until 4–5 times the optimum are used. The upper levels of treatment are much less critical. In general, the quantity of bromate effectively lies between .0001% and .003%. The preferred bromate to the employed in this embodiment of the invention is potassium bromate.

The exact mode of action of these chelates, and in this respect FeEDTA$^{-2}$ and FeEDTA$^{-1}$ are equivalent, is not accurately known but it is believed that they act as catalysts transferring atmospheric oxygen and oxidizing those labile parts of the flour and its proteins which are altered by the chemical oxidizer processed beneficially rather specifically and nothing else. In the embodiment utilizing the chelate and the bromate, the bromate may function as an activating agent for the chelate. It is also possible that the chelates act as catalysts potentiating, directing and intensifying the oxidizing action of the trace of bromate required. If this latter is the case, the functionality of the bromate is increased dramatically by a factor of five to ten.

The iron chelates which are employed according to the invention can be conveniently incorporated in yeast leavened doughs in the form of dough conditions and yeast foods, that is, in combination with other improvers or yeast nutrients. For example, combinations containing the iron chelate and a source of calcium ions and a source of ammonium ions in such proportions that they provide between 50 and 100 moles of calcium and ammonium ions for each mole of iron in said chelate when used in dough at a level to provide between .001 and .02% based on the flour. In the embodiment utilizing the bromate, the presence of the bromate will be found to enhance the effectiveness of the chelate.

Also, as will be seen below, combinations of the iron chelates with the bromate alone or further with ascorbic acid are of especial value in the conditioning of doughs.

Testing has indicated that materials which will elaborate the anions, FeEDTA$^{-2}$ or FeEDTA$^{-1}$, in the aqueous phase of a dough are functionally equivalent. The associated cations in this phase, naturally present or intentionally added as the bakers' art is usually practiced, have no discernible effects on this functionality.

The bromate ion when added with the chelate activates the chelate, or vice versa. No other common oxidant has been found to perform this function in the processing of flour or dough.

It might also be expected that related metal ions might function in the manner of iron in the present invention and that ligands derived from other chelating agents might be as functional as those from the edetates. It has been found that the iron can be replaced by either copper or manganese and are equivalent functionally. The ligand from the ethylenedinitrilotetraacetates can be replaced by those derived from the chemically related chelating agents trisodium N hydroxyethyl ethylenedinitrilotriacetate or the pentasodium diethylene triamine pentaacetate. Neither of these metal ions nor these ligands are as acceptable for food use as the iron edetates and the latter are preferred.

As a method of inclusion of functional trace ingredients such as these chelates alone or in combination with bromates in flour or doughs, the milling and baking industries use improver mixes in which the trace ingredients are admixed with other active materials and fillers or produce compounds which can be added to a flour stream in the mill or the dough in the bakery with precision using their available measuring devices. For inclusion in such mixes, consideration must be given to a number of properties of the iron chelates in addition to their functionality. Among these are the economics of manufacture, stability, hygroscopicity, compatibility with other components and color. For inclusion in a mix containing ascorbic acid the chelate should be nonoxidative and not basic in reaction.

The following examples will serve to illustrate the nature of the invention, its ramifications, the routes by which it may be practiced and the outstandingly beneficial effects that it has in improving flour and the yeast leavened baked products made from it. In these examples standardized bread making procedures were employed. Bread is the basic yeast leavened baked product; other varieties of yeast leavened products are but variants. The flour proteins responsible for their unique character are the same and therefore the results obtained with bread are illustrative of those obtained with other baked foods.

EXAMPLE 1

It is usual for commercial bakers to use a two stage or sponge and dough process for making bread. To evaluate the instant improving process, the following procedure typical of actual practice was employed.

A 70% sponge was first prepared using the following formula. In bakers' parlance percentage means parts by weight per 100% of flour in the total formula.

Sponge formula

| Ingredient: | Parts by weight |
|---|---|
| Flour (bakers' patent) | 70 |
| Water | 42 |
| Yeast (compressed) | 2.50 |
| Shortening (hydrogenated veg.) | 2.00 |
| Starch | .3023 |
| Salt | .1875 |
| Calcium sulfate | .1875 |
| Ammonium chloride | .0728 |
| Additive under test | Variable |

The ingredients in this formula starting with starch are usually preblended and weighted as a unit by the baker as "yeast food." In this case the level is .75%.

These ingredients were mixed together in a dough mixer under controlled conditions to get a uniform and coherent mass which was removed from the mixer at 80° F.

This mass or sponge was fermented in a trough at 80° F. and 80% RH for 4.5 hours. It was then added to the dough ingredients listed below in the bowl of the mixer.

Dough formula

| Ingredient: | Parts by weight |
|---|---|
| Flour (bakers' patent) | 30 |
| Water | 24 |
| Sugar | 7 |
| Salt | 2 |
| Nonfat dry milk solids | 2 |
| Calcium propionate | .25 |

After a short incorporating mix at low speed, the dough was mixed at high speed to obtain those physical characteristics referred to as a fully developed pliable dough.

The mixed doughs were then returned to the trough at 80° F. and given a floor time of 45 minutes. The doughs were then divided to 453.6 grams loaf sizes and rounded. The dough pieces were given 10 minutes overhead proof and were then sheeted, curled, moulded and panned in 8" x 4" x 2.5" pans. The loaves were proofed at 107° F. to ¾" above the pan and baked at 435° F. for 20 minutes.

It will be understood that all these factors and operations were identical and controlled, so that only the additives were being evaluated for function.

It is standard practice to determine the volumes of such test loaves by a rape seed displacement procedure and to give then a quality score based on a subjective evaluation of color and nature of crust, loaf symmetry, texture and color of crumb, grain and odor and taste. Practically, 100 score bread is the unattainable ideal; 80 score bread is just salable; 90 score bread is excellent. Usual commercial bread on this basis scores 82 to 86.

The process of this invention, that is the improvement of doughs and baked products by the introduction into them of small amounts of the iron chelates of ethylenedinitrilotetraacetates was evaluated by this procedure at various increments from zero to .01350%, bakers' percentage. Doughs containing ideal and excessive levels of potassium bromate were prepared as controls. The results are tabulated below.

| Test No. | Additive used | Parts by wt. | Loaf vol. (ml.) | Quality score |
|---|---|---|---|---|
| 1 | None | | 1,975 | 82 |
| 2 | KBrO₃ | .00225 | 2,000 | 87 |
| 3 | KBrO₃ | .00675 | 1,950 | 81 |
| 4 | NaFeEDTA | .00113 | 2,025 | 87 |
| 5 | NaFeEDTA | .00225 | 2,075 | 89 |
| 6 | NaFeEDTA | .00675 | 2,025 | 89 |
| 7 | NaFeEDTA | .01350 | 2,055 | 89 |
| 8 | Na₂FeEDTA | .00113 | 2,050 | 89 |
| 9 | Na₂FeEDTA | .00225 | 2,000 | 89 |
| 10 | Na₂FeEDTA | .00675 | 2,030 | 88 |
| 11 | Na₂FeEDTA | .01350 | 2,030 | 88 |

These data illustrate clearly the beneficial effects of the proper level of potassium bromate upon the characteristics of bread containing it. The optimum level, Test 2, produced a well developed loaf of good volume, fine and tender grain and texture (hence better digestibility). Exceeding this optimum by a factor of three produced a loaf with a harsh rough crust, wild break and reduced volume. The crumb was open and harsh in texture, the grain uneven. A baker would refer to it as over-oxidized in character. This critical nature of bromate action requires precise and expensive control by millers and bakers to prevent over-treatment.

The iron chelates, both ferrous and ferric, of ethylenedinitrilotetraacetate had very beneficial effects at all levels tested. The loaves were comparable or better than those with optimum bromate at all levels.

The effects of the iron chelates were considered to be identical. It is suggested that in the dough they are identical; they may be ferrous or ferric or at some transport oxidation state presently unrecognized. The chelates both had about twice the effect of bromate at the lowest level of inclusion.

Further, and most important and noteworthy, even at 6–12 times the level of apparent maximum effectiveness neither the FeEDTA$^{-2}$ nor the FeEDTA$^{-1}$ had any deleterious effects upon bread quality.

EXAMPLE 2

A 70% sponge was prepared using the following formula in the manner described in Example 1.

Sponge formula

| Ingredient: | Parts by weight |
|---|---|
| Flour (bakers' patent) [1] | 70 |
| Water | 42 |
| Yeast (compressed) | 2.50 |
| Shortening (hydrogenated veg.) | 2.00 |
| Starch | .3023 |
| Salt | .1875 |
| Calcium sulfate | .1875 |
| Ammonium chloride | 0.728 |
| Potassium bromate | Variable |
| Additive under test | Variable |

[1] Free of any trace of added bromate.

The ingredients in this formula starting with the starch were preblended and weighed as a unit by the baker as "yeast food." In this case the level was found to be .75%.

These ingredients were mixed together in a dough mixer under controlled conditions to get a uniform and coherent mass which was removed from the mixer at 80° F.

This mass or sponge was fermented in a trough at 80° F. and 80% RH for 4.5 hours. It was then added to the dough ingredients listed below in the bowl of the mixer.

Dough formula

| Ingredient: | Parts by weight |
|---|---|
| Flour (bakers' patent) | 30 |
| Water | 24 |
| Sugar | 7 |
| Salt | 2 |
| Nonfat dry milk solids | 2 |
| Calcium propionate | .25 |

After a short incorporation mix at low speed, the dough was mixed at high speed to obtain those physical characteristics referred to as a fully developed pliable dough.

The dough so mixed was then returned to the trough at 80° F. and given a floor time of 45 minutes. The dough was then divided to 453.6 gram loaf sizes and rounded. The dough pieces were given 10 minutes overhead proof and were then sheeted, curled, moulded and panned in 8" x 4" x 2.5" pans. The loaves were pan proofed at 107° F. to ¾" above the pan and baked at 435° F. for 20 minutes.

It will be understood that all these factors and operations were identical and controlled in the making of these baking evaluations so that only those ingredients listed as variable were being evaluated for function.

It is standard practice to determine the volumes of such test loaves by a rape seed displacement procedure and to give them a quality score based upon a subjective evaluation of the color and nature of the crust, loaf symmetry, texture and color of crumb, grain and odor and taste. Practically, 100 score bread is an unattainable ideal; 80 score bread is just salable; 90 score bread is excellent. Usual commercial bread on this basis scores 82 to 86.

The process of this invention, that is the improvement of doughs and baked products by the inclusion into them of small amounts of the iron chelates of ethylenedinitrilotetraacetates in conjunction with traces of bromates, much less than usual, was evaluated by this test baking technique. The levels of the iron chelate, sodium ferric ethylenedinitrolotetraacetate, were varied between zero and .01350%, bakers' percentage. The levels of potassium bromate were varied from zero to .00675% of this additive alone to establish its normal optimum and to .00225% in combination with the chelate. The results of these bake tests are tabulated below.

| Test No. | Parts by wt. | | Loaf vol. ave. (ml.) | Quality score |
|---|---|---|---|---|
| | KBrO₃ | NaFeEDTA | | |
| 1 | | | 2,005 | 79 |
| 2 | .00015 | | 2,010 | 81 |
| 3 | .00023 | | 2,067 | 82 |
| 4 | .00038 | | 2,075 | 82 |
| 5 | .00150 | | 2,110 | 83 |
| 6 | .00225 | | 2,137 | 83 |
| 7 | .00675 | | 2,030 | 79 |
| 8 | | .00075 | 2,020 | 80 |
| 9 | | .00113 | 2,015 | 81 |
| 10 | | .00225 | 1,995 | 79 |
| 11 | | .00450 | 1,990 | 79 |
| 12 | | .01350 | 2,005 | 79 |
| 13 | .00038 | .00075 | 2,135 | 84 |
| 14 | .00038 | .00113 | 2,110 | 83 |
| 15 | .00038 | .00225 | 2,130 | 84 |
| 16 | .00038 | .00450 | 2,110 | 83 |
| 17 | .00038 | .01350 | 2,125 | 84 |
| 18 | .00015 | .00225 | 2,115 | 83 |
| 19 | .00023 | .00225 | 2,157 | 86 |
| 20 | .00038 | .00225 | 2,125 | 85 |
| 21 | .00045 | .00225 | 2,140 | 85 |
| 22 | .00150 | .00225 | 2,135 | 84 |
| 23 | .00225 | .00225 | 2,020 | 79 |
| 24 | .00023 | .00075 | 2,090 | 84 |
| 25 | .00023 | .00113 | 2,157 | 86 |

These data illustrate clearly the beneficial effects obtained by the inclusion of potassium bromate upon the characteristics of bread containing it. These data demonstrate that the optimum level of potassium bromate for this particular flour is .00225%, this is 22.5 p.p.m. based on flour and is equivalent to what would be obtained by the use of .75% of the usual yeast food (Test 6).

This optimum produced a well developed loaf of bread of good volume, fine and tender grain and texture (hence better digestibility). Exceeding this optimum by a factor of three produced a loaf with a harsh rough crust, a wild break and reduced volume. The crumb was open and harsh in texture, the grain uneven. A baker would refer to it as overoxidized in character. This critical aspect of bromate action requires precise and expensive control by bakers to prevent over treatment.

The iron chelates, in this case the ferric or Fe(III) complex with ethylenedinitrilotetraacetate, by themselves have no effects even at relatively high levels. The absence of harmful effects is particularly noteworthy (Tests 8–12).

The use of potassium bromate at a suboptimal level, at .00038% as compared with the .00225% optimum, in combination with various increments of NaFeEDTA clearly demonstrates the nature of this invention. The activity of the bromate was increased by a factor of between five and ten and the level of chelate required to accomplish this increase was neither critical nor deleterious in any way (Tests 13–17).

The optimum level of bromate in combination with the chelate was established as being about .00023% while an excess by a factor of about six caused no gross deleterious effects. Ten times this apparent optimum, in combination with the chelate, did give overoxidation.

EXAMPLE 3

The sponge and dough process for bread making requires about four hours of sponge fermentation under controlled conditions to permit the changes which are necessary for the production of quality baked goods. A method which would produce satisfactory baked goods and eliminate this four hour delay and obviate the need for temperature and humidity controlled fermentation rooms would have obvious economic significance.

This can be done by use of a formula in which the acids formed by the long fermentation are introduced as part of the formula. Lactic acid, acid phosphates and other food acids may be used; fumaric acid is perhaps typical of these. The formula should also contain a lipoidal improver such as calcium stearyl 2 lactylate.

Significantly, possibly because they have a shorter time to act, much higher levels of the improvers such as potassium bromate, ascorbic acid or azodicarbonamide are required than in the process with a full fermentation. As a result very close control of processing conditions is needed to prevent aberant oxidative effects.

A typical formula for such a fast bread production is as follows.

Fast bread formula

| Ingredient: | Parts by weight |
|---|---|
| Flour (bakers' patent) | 100 |
| Sugar | 4 |
| Salt | 2 |
| Nonfat dry milk solids | 2 |
| Lard | 1 |
| Calcium stearyl-2 lactylate | .5 |
| Calcium propionate | .25 |
| Calcium sulfate | .125 |
| Fumaric acid | .115 |
| Ammonium chloride | .0485 |
| Ascorbic acid | .0075 |
| Potassium bromate | .0030 |

Water—variable depending on flour—60–70.
Yeast—variable depending on flour—2.5–5.0.

Bake tests were made using this formula in which the amounts of ascorbic acid and potassium bromate were varied or replaced with the ferric chelate of ethylenedinitrilotetraacetate.

The dry ingredients were placed in the mixer with 3.25 parts of compressed yeast and 70 parts of water. The dough was then properly mixed and removed from the mixer at 85±2° F. They were placed in the troughs and given a floor time of 30 minutes at 80° and then divided and rounded. After 15 minutes overhead proof, the dough pieces were made up, panned, proofed, and baked as in Example 1.

The data pertaining to this series of tests are tabulated below:

| Test No. | KBromate | Ascorbic acid | FeNaEDTA | Loaf vol. | Quality score |
|---|---|---|---|---|---|
| 1 Control | .0030 | .0075 | | 2,020 | 84 |
| 2 | | | | 1,955 | 80 |
| 3 | .0030 | | .0075 | 1,950 | 79 |
| 4 | | .0075 | .0030 | 2,025 | 87 |
| 5 | | .0075 | | 1,930 | 81 |
| 6 | | .0075 | .0015 | 2,025 | 84 |
| 7 | | .0075 | .0030 | 2,030 | 84 |
| 8 | | .0075 | .0120 | 2,030 | 89 |
| 9 | | .0075 | .0180 | 2,030 | 89 |
| 10 | | | .0030 | 2,000 | 84 |
| 11 | | | .0030 | 2,075 | 84 |
| 12 | | | .0030 | 2,050 | 89 |
| 13 | | | .0030 | 2,050 | 89 |
| 14 | | | .0030 | 1,990 | 89 |
| 15 | | | .0090 | 2,000 | 85 |
| 16 | .0030 | | | 2,000 | 86 |
| 17 | .0090 | | | 1,985 | 83 |

A number of pertinent conclusions regarding the process of this invention may be derived from these data.

In the fast bread procedure, the potassium bromate may be replaced directly by iron chelates with beneficial effects on the product. The chelate will not replace ascorbic acid in function in combination with bromate. The combination of FeNaEDTA and the bromate produced loaves with the rough exterior, wild break and the open coarse grain referred to by bakers as overoxidized (Tests 1–4).

The function of the iron chelates, which are neither oxidizing nor reducing agents of note, is much closer to that of potassium bromate, a definite oxidizer, than it is to ascorbic acid, a reducer. This suggests that the bromate is acting as an unselective oxidizing chemical while the chelates may be acting as highly selective catalysts causing air oxidation of those materials or sites on the gluten responsible for the observed effects in baking. This would explain the overoxidized character noted when iron chelates and bromate are used simultaneously, with the bromates being present in amounts normally present or in excess thereof.

In this fast process, ascorbic acid alone produces a loaf low in volume with irregular grain. FeNaEDTA used in conjunction with ascorbic acid at very low levels resulted in loaves of very good volume and very desirable internal properties. In general, good results are obtained with combinations of the iron chelate and ascorbic acid at concentrations within the ranges .001% to .02% chelate and .003% to .012% ascorbic acid (bakers' percentage). For this particular flour maximum improvements were obtained with .0030%, bakers' percentage, of chelate and .0075% of ascorbic acid. Most significant, the chelate could be used at even six times the amount required for optimum improvement without impairment of the product. This lack of critical requirement is a most desirable feature of the new process (Tests 5–9).

With the apparent minimum addition of FeNaEDTA for optimum benefits to the product less ascorbic acid is required for best effect than is the case where bromate is employed for oxidation. It is probable that this is the case because of interaction and mutual destruction of bromate and ascorbic acid when they are employed together. With FeNaEDTA as the apparent oxidizer the optimum action of ascorbic acid was obtained at .0038% or half that required with bromate as oxidizer. This is of economic significance (Tests 10–13).

A direct comparison of the oxidative effects of potassium bromate and FeNaEDTA in the absence of ascorbic acid indicated that the chelate was less critical as to usage level and more specific in its effects than the bromate. It was able to replace much of the volume response which would occur with ascorbic acid added. Potassium bromate had a definite and critical level for causing improvement; higher levels cause deleterious effects on bread character (Tests 14–17).

EXAMPLE 4

The no fermentation process described in Example 3 was repeated utilizing a different formulation as follows.

Fast bread formula

| Ingredient: | Parts by weight |
|---|---|
| Flour (bakers' patent) [1] | 100 |
| Sugar | 4 |
| Salt | 2 |
| Nonfat dry milk solids | 2 |
| Lard | 1 |
| Calcium stearyl-2 lactylate | .5 |
| Calcium propionate | .25 |
| Calcium sulfate | .125 |
| Fumaric acid | .023 |
| Ammonium chloride | .0485 |
| Ascorbic acid | .0080 |
| Potassium bromate | .0040 |
| Water—variable depending upon flour—60.70. | |
| Yeast—variable depending upon flour—2.5–5.0. | |

[1] Free of any trace of added bromate.

Bake tests were made using this formula in which the amounts of ascorbic and potassium bromate were varied and used in combination with different levels of the ferric chelate of ethylenedinitrilotetraacetate.

The dry ingredients were placed in the mixer with 3.0 parts of compressed yeast and 70 parts of water. The doughs were then properly mixed and removed from the mixer at 85±2° F. They were placed in the troughs and given a floor time of 30 minutes and then were divided to one pound loaf pieces and rounded. After 15 minutes overhead proof, the dough pieces were made up, panned, proofed and baked as in Example 1.

The data pertaining to this series of tests are tabulated below:

| Test No. | Parts by weight | | | Loaf vol. | Quality score |
|---|---|---|---|---|---|
| | KBromate | Ascorbic acid | NaFeEDTA | | |
| 1 Control | .0040 | .0080 | | 2,030 | 85 |
| 2 | | | | 1,900 | 79 |
| 3 | | | .0030 | 2,100 | 87 |
| 4 | .0007 | .0080 | | 1,967 | 83 |
| 5 | .0007 | .0080 | | 2,000 | 82 |
| 6 | | .0080 | | 2,095 | 87 |
| 7 | .0007 | .0040 | .0030 | 2,087 | 87 |
| 8 | .0007 | .0020 | .0030 | 2,065 | 87 |
| 9 | .0007 | .0010 | .0030 | 2,080 | 88 |
| 10 | .0007 | .0020 | .0015 | 2,065 | 87 |
| | .0007 | .0020 | .0008 | | |

A number of pertinent conclusions regarding the process of this invention may be derived from these data.

In the fast bread procedure, the potassium bromate required for optimum results can be reduced by a factor of at least six when it is used in conjunction with the iron chelate of ethylenedinitrilotetraacetate. The fast process requires from two to three times as much bromate as a sponge and dough or an ordinary straight dough process to yield breads of comparable quality. The reductions accomplished by using the bromate chelate combinations are partcularly significant (Test 3).

In this process the functional maximum of ascorbic acid is about .0080% when used in combination with the optimum of potassium bromate which is about .0040%. An excess of ascorbic acid does no harm but serves no purpose and it is relatively expensive. When the potassium bromate level is reduced to about .0007% and used in combination with the chelate, it has been found that the functional maximum of ascorbic acid may be reduced to .0020% or less. This is of economic significance (Tests 5–10).

A satisfactory ratio of bromate, ascorbic acid and chelate for use in an additive mixture for fast bread is about 1:3:2.

The functions of the chelates in baking are not definitely known but the results of these tests permit some tentative conclusions. In a given process, better bread can be obtained when the proper chelate-bromate pair is substituted for the optimum bromate. The bromate of the pair is abiut 10%–20% of the usual optimum amount employed. The amount of chelate must be sufficient but the level is not critical. The baking results suggest that the bromate is acting more selectively and more rapidly in the dough and the chelate is functioning as a catalyst in the reaction. As a catalyst it is directing the bromate, a non-selective oxidizing agent, to those materials or sites in the wheat gluten responsible for the observed effects in baking. The result is fewer deleterious side reactions and a better baked product.

The observed sparing effect upon ascorbic acid is probably due to the specific catalytic action of the chelate. Normally there is interaction and mutual destruction of the bromate and the ascorbic acid when they are used together. With the NaFeEDTA acting as a catalyst to both increase the rate and the selectivity of the bromate action less ascorbic acid is lost through oxidation and less is needed for the maximum improving effect in the bread.

EXAMPLE 5

Dough conditioners or yeast food preparations such as bakers normally employ were formulated as shown below and made up by thoroughly mixing the dry powders together. These are typical of commercial formulations of dough conditioners except that the potassium bromate normally added during the formulation was replaced with the ferrous of ferric chelates of ethylenedinitrnlotetra-acetates.

The chelates were dried reaction products of ferrous sulfate and ferric chloride with Na₄EDTA and thus contained about one third sodium sulfate or chloride as diluent.

Dough conditioner formulas

| Ingredient: | Percentage |
|---|---|
| Starch (filler) | 40 |
| Calcium Sulfate (terra alba) | 25 |
| Sodium chloride | 24.85 |
| Ammonium chloride | 9.7 |
| Chelate mixture (ferric or ferrous) | .45 |

These dough conditioners were used in lieu of the yeast food ingredients in the sponge and dough formula given and were test baked and the products evaluated as in Example 1. The conditions were used at the .75% level, bakers percentage. Bake tests were also made using no yeast food and with a commercial yeast food of the bromate type at the same level. The results are tabulated below.

| Test No. | Conditioner used | Loaf vol. | Quality score |
|---|---|---|---|
| 1 | None | 1,970 | 81 |
| 2 | .75% commercial yeast food | 2,000 | 87 |
| 3 | .75% ferrous chelate formula | 2,040 | 89 |
| 4 | .75% ferric chelate formula | 2,025 | 87 |

The breads made with the dough conditioners containing the iron chelates of ethylenedinitrilotetraacetates were very good in volume and internal characteristics. In all respects, the results were as good or better than those effected by the commercial bromate containing product.

The data demonstrate that the iron chelates, preformed, can be used to formulate fully satisfactory dough conditioners and that such mixtures incorporated in a dough fully serve the purposes of this invention.

EXAMPLE 6

Three yeast food type dough conditioners were prepared to demonstrate a further mode by which the process may be practiced. These formulas are given below.

| Ingredient | Dough conditioner formulas, percent | | |
|---|---|---|---|
| | Formula I | Formula II | Formula III |
| CaHPO$_4$ | 50 | 50 | 50 |
| NaCl | 20 | 20 | 20 |
| Starch (filler) | 22.675 | 21.20 | 16.45 |
| NH$_4$Cl | 7 | 7 | 7 |
| FeSO$_4$·H$_2$O | .125 | 1.50 | 6.25 |
| Na$_4$EDTA | .30 | .30 | .30 |

With the exception of the ferrous sulfate and the sodium edetate, Formula I is very similar to commercial yeast foods which contain about .12% of potassium bromate and .10% of potassium iodate.

Formula II contains enough iron to provide the minimum of this element at a usage level of .5% (bakers' percent) to qualify bread produced with it to be called iron enriched by current standards. This is 8 mg. per pound.

Formula III contains enough iron to provide bread qualifying as iron enriched under the proposed standard if used at the .5% level. The proposed minimum is 32 mg. per pound of enriched bread.

The dough conditioner formulas were used in the bread recipe and procedure of Example 1 at the .5% level, bakers percentage, in place of the yeast food ingredients in the sponge. Test bakes were also made containing no yeast food and with a commercial yeast food for comparisons. The results of these bake tests are presented below.

| Test No. | Variable | Loaf volume | Quality scor |
|---|---|---|---|
| 1 | No yeast food | 1,970 | 88 |
| 2 | Commercial YF | 2,080 | 8 |
| 3 | Formula I | 2,065 | 8 |
| 4 | Formula II | 2,100 | 90 |
| 5 | Formula III | 2,100 | 89 |

The functionality of the commercial yeast food was good and its effects obvious and beneficial. The test formulas containing the components or precursors for producing the ferrous chelate of ethylenedinitrilotetraacetate, however, were clearly superior in their effect on dough condition, machinability and gas retention. The loaves of bread were exceptionally fine grained and light.

These results admit of several significant conclusions with regard to the instant process.

It will be quite apparent that the process may be practiced by the inclusion in the dough batch of the baked product of the components required to form the active iron containing chelates as well as by using the preformed chelates. The reaction takes place in the water of the dough to form the active chelate. The reaction between the ions of iron and those of ethylenedinitrilotetraacetate is so specific and the chelates are so stable that they can be effectively formed in situ by this means.

This example illustrates that the effective level of iron chelate used in this process can yield a significant proportion, about 10%, of the amount of iron needed to enrich bread with this essential element by current standards. The contribution could quite possibly but uneconomically be raised to 100% by use of the chelates. The practice demonstrated in the use of Formulas II and III would probably be better.

This example and others demonstrate that the practice of this process is feasible by the introduction of soluble iron salts and ethylenedinitrilotetraacetates or the iron chelates of this ligand into the dough batch of the baked product premixed with any of the normal ingredients, liquid or solid. It would, for instance, be possible for a baker to obtain the benefits of this process by the introduction into his doughs of a properly formulated mixture of niacin, thiamine, riboflavin and iron as long as some 10% of the latter was as soluble salts and the mixture contained enough soluble ethylenedinitrilotetraacetate to complex the ions of iron from this salt or was included as the iron chelates of this complexing agent.

EXAMPLE 7

A preparation of NaFeEDTA was made by boiling one mole equivalent of Na$_4$EDTA in a methanol solution of an equivalent of ferric chloride hexahydrate until the color of the latter in the liquid was substantially discharged. The solids were separated from the alcohol by filteration and dried under vacuum. The yellow crystalline powder consisted of NaFeEDTA admixed with 32.3% of sodium chloride formed in the metathetical reaction.

This material was mortared to a fine powder and blended intimately into white wheat flour at the rate of 23 milligrams to the pound.

This flour was test baked using the formula of Example 1 without the additive and the sponge and dough procedure of Example 1 at intervals over a period of about three months. The same flour, unprocessed, was stored and baked to provide a parallel control. The results are summarized below.

TREATED FLOUR BAKE TESTS

| Test | Age of flour | Variable | Loaf vol. | Quality score |
|---|---|---|---|---|
| 1 | 0 days | Control | 1,975 | 81 |
| | | Treated | 2,020 | 87 |
| 2 | 26 days | Control | 1,975 | 83 |
| | | Treated | 2,025 | 89 |
| 3 | 87 days | Control | 1,990 | 83 |
| | | Treated | 2,025 | 89 |

The bread obtained from the flour treated with the NaFeEDTA was very good and much better than that made with the same flour untreated. The results indicated that the process improved the flour for its intended use and that the flour chelate mixture is stable in storage. Flour so treated can thus serve the aims of the process of this invention.

EXAMPLE 8

Hydroferroethylenedinitrilotetraacetic acid or

$H_2FeEDTA$ is nearly ideal for inclusion in compounded dry improver mixes and especially so when ascorbic acid is also a component.

Hydroferroethylenedinitrilotetraacetic acid is not commercially available but it can be synthesized economically and in high purity by dissolving iron powder in a boiling solution of ethylenedinitrotetraacetic acid or by reacting ferrous sulfate with $Na_2H_2EDTA$ in a hot solution, both with careful exclusion of air. Solubility is such that about 80% will crystallize as fine faintly pink crystals upon agitating and cooling a solution saturated with the acid at the boiling point.

The dry powdered $H_2FeEDTA$ is at least as stable as ferrous sulfate when pure. It may be exposed to the air for several weeks without apparent change. It is not hygroscopic, is essentially colorless, is strongly acid in reaction and is a reducing agent.

Dry mixes containing both $H_2FeEDTA$ and ascorbic acid are quite stable in sealed storage and are completely functional. To illustrate their usefulness and functionality five bread improver mixes were prepared to be used at the 2.5% level (bakers' percentage) in a variant of the fast bread described in Example 2.

IMPROVER MIX FORMULAS

| Ingredient | Formula (percent) | | | | |
|---|---|---|---|---|---|
| | I | II | III | IV | V |
| Salt | 80.00 | 80.00 | 80.00 | 80.00 | 80.00 |
| CaHPO$_4$ | 5.00 | 5.00 | 5.00 | 5.00 | 5.00 |
| Fumaric acid | 4.40 | 4.40 | 4.40 | 4.40 | 4.40 |
| (NH$_4$)$_2$HPO$_4$ | 2.00 | 2.00 | 2.00 | 2.00 | 2.00 |
| Ascorbic acid | .16 | .16 | .16 | .16 | .16 |
| Starch | 8.44 | 8.42 | 8.38 | 8.32 | 8.08 |
| H$_2$FeEDTA | .00 | .02 | .06 | .12 | .36 |

These improver mixes were test baked using the following fast bread formula and procedure.

Fast bread formula

Ingredient: Parts by weight
- Flour — 100.0
- Sugar — 6.0
- Hydrogenated shortening — 2.0
- Calcium stearyl 2 lactylate — .5
- Calcium propionate — .2
- Improver mix — 2.5
- Compressed yeast — 3.5
- Water — 67.0

These ingredients were mixed and processed to make bread as in Example 3 with one minor exception. The dough pieces were given an overhead proof of 15 rather than 10 minutes.

The results from duplicate tests are presented below.

| Improver mix | H$_2$FeEDTA, percent | Avg. loaf volume, ml. | Quality score |
|---|---|---|---|
| I | .0000 | 2,025 | 84 |
| II | .0005 | 2,020 | 85 |
| III | .0015 | 2,050 | 87 |
| IV | .0030 | 2,155 | 90 |
| V | .0090 | 2,150 | 90 |

The bread having only ascorbic acid (I) showed good volume response but was inferior internally. The crumb was open and had round rather than elongated cells and as a result lacked sheen. Loaves containing less than the optimum amount of hydroferroethylenedinitrilotetraacetic acid (II and III) were not markedly different in volume but were much superior in their internal characteristics.

The improver mix IV provided really excellent bread and it was probably the ultimate that could be obtained with the flour employed. This mix contributed .0030% of $H_2FeEDTA$ to the bread formula and is about optimum. Mix V with three times this optimum level of chelate had absolutely no deleterious effects.

EXAMPLE 9

Crude preparations of ferrous and ferric chelates of ethylenedinitrilotetraacetates were prepared by mixing equimolar solutions of tetrasodium ethylenedinitrilotetraacetate and ferrous sulfate and ferric chloride and taking them to dryness in a boiling water bath. A natural gas blanket and sweet were used with the ferrous preparation to minimize air oxidation. These materials, thoroughly ground, were calculated to contain 67.7% of the ferric chelate and 73.5% of the ferrous chelate with the balance being sodium salts.

These materials and the unreacted components were blended with flour so that the use of the resultant blends in bake tests at the .25% level would introduce the additive at a level equivalent to .0020% of the ferric chelate.

| Additive | Amount, gm. | Amount of flour, gm. |
|---|---|---|
| NaFeEDTA | .80 | 99.20 |
| Na$_2$FeEDTA | .79 | 99.21 |
| Na$_4$EDTA | .56 | 99.44 |
| FeSO$_4$·H$_2$O | .25 | 99.75 |
| FeCl$_3$·6H$_2$O | .40 | 99.60 |

These preparations were used in test bakes by the procedure and formula in Example 4. In these tests, however, .0075% of ascorbic acid was used and the flour weight was adjusted for the .25% or .50% used in the additive flour blends above.

The results of these tests are presented below.

| Test No. | KBrO$_3$, parts by wt. | Additive | Loaf vol. | Quality score |
|---|---|---|---|---|
| 1 Control | .0035 | | 2,067 | 84 |
| 2 | .0006 | | 2,000 | 81 |
| 3 | .0006 | NaFeEDTA | 2,075 | 86 |
| 4 | .0006 | Na$_2$FeEDTA | 2,100 | 87 |
| 5 | .0006 | Na$_4$EDTA+FeCl$_3$ | 2,080 | 85 |
| 6 | .0006 | Na$_4$EDTA+FeSO$_4$ | 2,095 | 86 |
| 7 | .0006 | Na$_4$EDTA | 2,000 | 81 |
| 8 | .0006 | FeCl$_3$ | 1,967 | 80 |
| 9 | .0006 | FeSO$_4$ | 1,995 | 81 |

These data demonstrate that the ferric and ferrous chelates of ethylenedinitrilotetraacetate are equally effective in accomplishing the purposes of this invention. Either will be found to increase the effect of bromate in bread dough by a factor of between 5 and 10. Also it is immaterial whether the Fe(II) or Fe(III) chelates are pre-formed or formed in situ in the dough through the incorporation of the components of the chelates (Tests 1–6).

The components of the chelates individually, to wit, the soluble iron salts and ethylenedinitrilotetraacetates, do not increase the effects of the bromate in the dough. The chelates are the effective materials (Tests 7–9).

EXAMPLE 10

In the process utilizing the bromate in combination with the chelate, there are three potential variables to be considered. These are the oxidating agent needed to activate the chelate, the chelating agent which supplies the ligand, and the metal ion complexed by that ligand.

By treating an otherwise unbleached and unmatured flour with each of the standard oxidizing agents and making bake tests using an iron chelate of ethylenedinitrilotetraacetate it was determined that only the bromates are functional in activating the chelates in this form of the invention and that even a trace will suffice as has been shown. The action of the others is unaltered in this respect. Even chemically similar oxidants, such as chlorates and nitrates, were also found to be unsatisfactory.

Baking evaluations having demonstrated the equivalence of the ferrous and ferric chelates, it would be suspected that the chelates of others of the elements of the transitional group of the periodic table might have similar effects. To test this potential, solutions were made up volumetrically using sulfates or chlorides of the elements and Na₄EDTA. Aliquots of these solutions were used in the sponge and dough bake test as in Example 2 so that the equivalent of .0025% of each chelate was employed with the liquid replacing a like amount of dough water.

There are also several commercially available chelating agents which have chemical properties and structures quite similar to the ethylenedinitrilotetraacetates. Four such compounds, in the form of sodium salts, were evaluated. These were:

(I) Disodium hydroxyethylnitrilodiacetate
(II) Sodium nitrilotriacetate
(III) Trisodium N hydroxyethyl ethylenedinitrilotriacetate
(IV) Pentasodium diethylenetriaminepentaacetate.

To test the functionality of these materials, solutions were made up volumetrically containing equimolar amounts of these reagents and ferrous sulfate. These solutions were used in test bakes, aliquots being taken so that the iron contribution to the dough was equivalent to .0025% of Na₂FeEDTA.

n all these bake tests .0003% of potassium bromate was included. The results are tabulated below:

| Test No. | Additive sol. | Avg. loaf vol. | Quality score |
|---|---|---|---|
| 1 | None | 2,018 | 79 |
| 2 | FeSO₄+Na₄EDTA | 2,120 | 87 |
| 3 | CuSO₄+Na₄ETDA | 2,075 | 86 |
| 4 | CoSO₄+EDTA | 2,006 | 80 |
| 5 | MnSO₄+Na₄EDTA | 2,090 | 86 |
| 6 | CrCl₃+Na₄EDTA | 2,010 | 79 |
| 7 | ZnSO₄+Na₄EDTA | 2,020 | 80 |
| 8 | NiSO₄+Na₄EDTA | 1,982 | 79 |
| 9 | FeSO₄+Na₄EDTA | 2,155 | 86 |
| 10 | FeSO₄+I | 2,025 | 80 |
| 11 | FeSO₄+II | 2,025 | 81 |
| 12 | FeSO₄+III | 2,142 | 86 |
| 13 | FeSO₄+IV | 2,115 | 85 |
| 14 | (Control .0020% KBrO₃) | 2,137 | 86 |

These results indicate that of the transitional element chelates, Cu(II) and Mn(II) have much the same effects as Fe(II). The physiological requirements for copper and manganese in the diet are not as well established as that of iron and for the purposes of this invention the Fe(II) and Fe(III) chelates of ethylenedinitrilotetraacetates are preferred (Tests 2–8).

Of the chelating agents, III and IV, which are structurally most similar to the edetates have apparently equal functionality in this process of this invention. The hydroxyethylnitrilodiacetates were not functional. For the purposes of this invention, however, the ethylenedinitrilotetraacetates which have established food uses are preferred (Tests 9–13).

EXAMPLE 11

Dough conditioners or yeast foods such as bakers normally employ were formulated as shown below and compounded by thoroughly mixing the dry powders together. The first (I) is typical of the commercial formulations and contains the usual level of potassium bromate. The others are according to the process of this invention and contains about 17% as much bromate in combination with the ferric or ferrous chelates of ethylenedinitrilotetraacetates (II and III).

The chelate preparations were dried reaction products of ferrous sulfate and ferric chloride with Na₂EDTA and thus contained about one third sodium sulfate or chloride as diluents.

| Formula | Dough conditioner formulations, percent | | |
|---|---|---|---|
| | I | II | III |
| Ingredient: | | | |
| Starch (filler) | 40 | 40.1 | 40.1 |
| Calcium sulfate | 25 | 25 | 25 |
| Sodium chloride | 25 | 25 | 25 |
| Ammonium chloride | 9.7 | 9.7 | 9.7 |
| Potassium bromate | .3 | .05 | .05 |
| Chelate | | ¹.15 | ².15 |

¹ Fe(II).
² Fe(III).

These dough conditions were used in place of the yeast food ingredients in the sponge and dough formula given and were test baked and the products evaluated as in Example 1. The conditions were used at the .7% level, bakers' percentage. A bake test was also made using no conditioner as a control. The results are tabulated below.

| Test No. | Conditioner used | Loaf vol. | Quality score |
|---|---|---|---|
| 1 Control | None | 2,037 | 82 |
| 2 | I (commercial) | 2,170 | 85 |
| 3 | II (Fe(II)) | 2,175 | 87 |
| 4 | III (Fe(III)) | 2,160 | 89 |

The breads made with the dough conditioners containing the iron chelates of ethylenedinitrilotetraacetates were very good in volume and internal characteristics. The results were better than those effected by the commercial high bromate type product. The data demonstrate that the iron chelates, preformed can be used to produce fully satisfactory dough conditioners with much less bromate being required and that such mixtures incorporated in a dough fully serve the purposes of this form of the invention.

EXAMPLE 12

Three yeast food type dough conditioners were prepared to demonstrate a further mode by which this process may be practiced. These formulas are given below.

| Ingredient | Dough conditioner formulas, percent | | |
|---|---|---|---|
| | Formula I | Formula III | Formula III |
| Ca(H₂PO₄)₂ | 50 | 50 | 50 |
| Starch | 22.53 | 21.16 | 16.41 |
| Salt | 20 | 20 | 20 |
| (NH₄)₂SO₄ | 7 | 7 | 7 |
| FeSO₄·H₂O | .13 | 1.50 | 6.25 |
| Na₄EDTA | .27 | .27 | .27 |
| KBrO₃ | .07 | .07 | .07 |

With the exception of the ferrous sulfate and the sodium edetate, Formula I is very similar to commercial yeast foods of a common type which contain .12% of potassium bromate and .10% of potassium iodate.

Formula II contains enough iron to provide the minimum of this element at a usage level of .5% to quality bread produced with it to be called enriched by current standards. This is 8 milligrams per pound.

Formula III contains enough iron to add 32 milligrams of this element to a pound of bread if used as a dough ingredient at .5%, bakers' percentage. This has been proposed as a standard for iron enrichment.

The dough conditioners were used in the bread recipe and procedure of Example 2 at the .5% level in place of the yeast food ingredients in the sponge. Bake tests were also made with no yeast food and with a commercial yeast food (Fermaloid) for comparisons. The results of these tests are presented below.

| Test No. | Variable | Loaf vol. | Quality score |
|---|---|---|---|
| 1 | No YF | 2,010 | 82 |
| 2 | Comm. YF | 2,175 | 88 |
| 3 | Formula I | 2,187 | 90 |
| 4 | Formula II | 2,182 | 90 |
| 5 | Formula III | 2,170 | 89 |

The functionality of the commercial yeast food was good and its effects obvious and beneficial. The test formulas containing the compounds or precursors for producing the ferrous chelate of ethylenedinitrilotetraacetate, with much less bromate and no iodate, however, were clearly superior in their effects on dough condition, machinability and gas retention. The loaves of bread were exceptionally fine grained and light.

These results admit of several significant conclusions with regard to the instant process.

It will be quite apparent that the process may be practiced by the inclusion in the dough batch of the baked products of the components required to form the active iron containing chelates as well as the preformed chelates. The reaction takes place in the water of the dough to form the chelate. The reaction between the ions of iron and those of ethylenedinitrilotetraacetate is so specific and the chelate is so stable that it can be effectively formed in situ by this means.

This example illustrates that the effective level of iron chelate used can yield a significant proportion, about 5%, of the amount of iron needed to enrich bread with this essential element by current standards. The contribution could quite possibly, but uneconomically, be raised to 100% by the use of the pre-formed chelates. The practice demonstrated in the use of Formulas II and III would be preferred.

EXAMPLE 13

Hydroferroethylenedinitrilotetraacetic acid or $H_2FeEDTA$ is nearly ideal for inclusion in compounded dry improver mixes, especially when ascorbic acid is also a component.

$H_2FeEDTA$ is not commercially available, but it can be synthesized economically and in high purity by dissolving iron powder in a boiling solution of ethylenedinitrilotetraacetic acid or by reacting ferrous sulfate with $Na_2H_2EDTA$. With either procedure air must be carefully excluded. The solubility of the compound is such that about 80% will crystallize as fine faintly pink crystals upon agitating and cooling a solution saturated with the acid at the boiling point.

The dry powdered $H_2FeEDTA$ is at least as resistant to oxidation as ferrous sulfate when pure. It may be exposed to dry air for several weeks without apparent change. It is not hygroscopic, is essentially colorless, is strongly acid, and is a reducing agent. These are all important when compounding with ascorbic acid is considered.

Dry mixes containing both ascorbic acid and $H_2FeEDTA$ with the requisite trace of bromate are quite stable in sealed containers at ambient temperatures and are completely functional. To illustrate their stability and usefulness, bread improver mix was prepared to be used at the 2.5% level, bakers' percentage, in a variant of the fast bread described in Example 4.

Improver mix formula

| Ingredient: | Percentage |
|---|---|
| Salt | 80.00 |
| Starch | 11.90 |
| $CaHPO_4$ | 5.00 |
| $(NH_4)_2HPO_4$ | 2.00 |
| Fumaric acid | .92 |
| Ascorbic acid | .09 |
| $H_2FeEDTA$ | .06 |
| Potassium bromate | .03 |

This improver mix was test baked using the following fast bread formula and procedure.

Fast bread formula

| Ingredient: | Parts by wt. |
|---|---|
| Flour (spring wheat patent)[1] | 100.0 |
| Sugar | 6 |
| Hydrogenated shortening | 2.0 |
| Calcium stearoyl 2 lactylate | .5 |
| Calcium propionate | .2 |
| Improver mix | 2.5 |
| Yeast | 3.5 |
| Water | 65.0 |

[1] Free of any trace of added bromate.

These ingredients were mixed and processed to make bread as in Example 4 and the loaves evaluated as described. The bake tests were repeated using the same flour periodically for about three months. The flour was stored in a refrigerator during this period to minimize changes; the improver mix was stored in a sealed container at room temperature.

The results obtained in these time tests are summarized below:

| Test No. | Age of improver | Loaf vol. avg. | Quality score |
|---|---|---|---|
| 1 | 0 days | 2,150 | 90 |
| 2 | 7 days | 2,095 | 88 |
| 3 | 26 days | 2,125 | 89 |
| 4 | 90 days | 2,125 | 90 |

This improver mix formula provided really excellent bread initially and in all subsequent tests over the three month period. Such changes as were observed could be ascribed to alterations in the flour or changes due to uncontrolled factors such as yeast quality or age. The results demonstrate that the combination of ingredients used in the improver mix is quite stable chemically.

The functionality of the hydroferroethylenedinitrilotetraacetic acid was shown to be excellent in combination with ascorbic acid and bromate and the ratio of these ingredients employed is satisfactory both functionally and economically. The formula given, however, is but an example and could be the subject of wide variation.

The flour used in this test was an excellent strong bakers patent with a 12.5% protein content and .42% ash which had been bleached with benzoyl peroxide. Weaker flours subjected to other treatments at the mill have been bake tested with this improver or similar formulations with comparable salutary results.

EXAMPLE 14

There are a number of bread and roll varieties made with extremely limited and lean formulas, usually by straight dough procedures, noted for their crisp and hard crusts and excellent taste when fresh. No dough conditioners are employed. Instead, to get the desired character in the finished products, the baker employs a flour which has been treated with potassium bromate by the miller. Such flour usually contains 50–100 p.p.m. or more of potassium bromate. These bread products usually have names which indicate a national or cultural origin.

To evaluate the process of this form of the invention in this context, a lot of spring wheat patent flour with a protein content of 12.4% was divided into three portions. One portion was left untreated as the control (I). A second portion was blended with potassium bromate powder at a level of 50 p.p.m. in the usual fashion (II). The third was treated by the instant process with 20 p.p.m. of NaFeEDTA and 10 p.p.m. of potassium bromate (III).

These flours were test baked, with careful control of times and temperatures, using a typical Puerto Rican "pan de aqua" or water bread formula and process. The formula was as follows.

Pan de aqua

| Ingredient: | Parts by weight |
|---|---|
| Flour | 100 |
| Salt | 2 |
| Sugar | 1 |
| Yeast (compressed) | 2 |
| Water | 60 |

These ingredients were mixed together for six minutes in a low speed mixer during which time a dry homogeneous dough displaying little evidence of gluten development was produced. The dough was removed from the mixer at 85° F. and fermented for 45 minutes at 85° F. The dough, which had about doubled in volume, was turned and knocked back.

After an additional 45 minutes of fermentation the dough was degassed and developed or refined by passing it 30 times through a pair of breaking rolls which in these operations serve in lieu of a high speed mixer. The doughs were divided into 14 ounce pieces and hand worked on the bench into 12 inch cylinders which were proofed for 90 minutes at 105° F. during which period they about doubled their height.

The proofed doughs were then slit lengthwise through the upper surface to a depth of about ¼ inch with a docking knife and baked in a hearth oven for 27 minutes at 400° F. The resultant bread was allowed to cool for one hour and was then measured and scored by skilled bakers. The data obtained is presented below.

| Test flour | Inches | | | | Qual. score |
|---|---|---|---|---|---|
| | Loaf length | Height | Width | Crust | |
| I (Control) | 13.82 | 2.58 | 4.25 | Tough | 83 |
| II | 12.50 | 3.12 | 4.25 | Crisp | 88 |
| III | 12.75 | 3.50 | 4.25 | do | 90 |

The control flour yielded a dough with a pronounced tendency to flow during proofing. This was reflected in the final loaf length. It produced poor volumed loaves as a result of lack of oven spring as indicated by the short height. The loaves did not have the desired crisp and flakey crust.

The flour containing 50 p.p.m. of potassium bromate yielded bread judged to be of very good quality. The dough had restricted flow in proofing but was extensible and gave a loaf of good volume with satisfactory crust and interior.

The flour treated with the chelate combination produced excellent bread of large volume and good symmetry. It approached the cylindrical ideal more closely than usual and had a very satisfactory crisp crust. It was judged to be of very superior quality.

This example illustrates that this form of the invention can be applied to flour as a treatment and that the baked product produced therefrom is of an improved nature. The combination of the iron chelate and bromate is superior in its effects to at least five times that amount of bromate used alone. It also illustrates that the process is operational in a traditional and typical straight dough process.

EXAMPLE 15

There are several processes for continuous bread making in current usage which have two elements in common. They use a high speed apparatus for dough mixing and require inordinately high levels of oxidants, primarily potassium bromate, for optimum results.

Two of these processes, the Do Maker and the Amflow, are reported to account for about 40% of the commercially produced white bread in the United States. There can be no doubt that there is a trend toward such processes because of the reduction in processing time, the saving of labor and space and the inherently better sanitation which they permit.

This experiment was conducted in a commercial bakery using the Do Maker equipment and process. The formula for the regular production in this bakery was as follows:

| Broth formula | Pts. | Shortening mixture | Pts. | Oxidant formula | Pts. |
|---|---|---|---|---|---|
| Water | 62 | Lard | 2.8 | Water | 2 |
| Glucose | 10 | Glyceryl Mono-stearate | .3 | KBrO₃ | (¹) |
| Dry milk | 1 | | | | |
| Salt (enriched) | 2 | | | | |
| Yeast | 3 | | | | |
| Yeast food | .6 | | | | |
| Calcium propionate | .1 | | | | |

¹ 70 p.p.m. of flour.

Quantities are in parts by weight per 100 of flour in the formula.

The process is highly automated and standardized. It consists essentially of preparing the broth and allowing it to ferment for about 2.5 hours. The broth is then brought together with flour, the shortening which is melted and the oxidant solution.

These are all taken to an ingredient premixer through a metering and piping system where they are blended. This blend is then pumped to the high speed mixer and developing unit where it is developed to a dough having a toothpaste-like consistency. This dough is extruded as loaf shaped masses directly into baking pans at a rate of about 100 pounds per minute. The pan proofing required one hour at 110° F. and the loaves were baked for 19 minutes at 440° F.

The yeast food in the broth formula was of the bromate-iodate type and contributed 7.2 p.p.m. of potassium bromate and 6.0 of potassium iodate as oxidants. The 70 p.p.m. added directly made a total 83.2 p.p.m. of combined oxidants and is probably typical of the process although at times as much as 150 p.p.m. are required for optimum results. It might be pointed out that the Standards of Identity for white bread permits a maximum of 75 p.p.m. of the total of bromates, iodates and peroxides.

For the evaluation of this invention in this process, the oxidant formula was altered in a manner calculated to provide identical functionality. This test formula was as follows:

Test oxidant formula

| | |
|---|---|
| Water | 2 parts. |
| Na₄EDTA | 64.00 p.p.m. of flour. |
| FeSO₄·XH₂O | 29.00 p.p.m. of flour. |
| KBrO₃ | 8.65 p.p.m. of flour. |

It was simply used in place of the regular oxidant solution.

Breads prepared using the regular oxidant formula and the variant in which 70 p.p.m. of bromate were replaced with about 12.5% of that amount in combination with the constituents required to produce an excess of the ferrous chelate of ethylenedinitrilotetraacetate were compared critically by experienced bakers and were judged to be equivalent in all respects.

It would be expected that other processes which use high speed mixing in combination with high oxidant levels such as the Amflow process, the Chorleywood process, and others, would react to the chelates and the much reduced bromate level in an analogous manner.

These examples demonstrate the value of this form of the invention and its usefulness in improving the handling properties of yeast leavened doughs and in improving the volume, appearance and eating qualities of the baked products made from them.

They have further demonstrate that the accomplishment of the process and its aims are served by the introduction of the iron chelates of ethylenedinitrilotetraacetate and a trace of a bromate into the dough by many routes. They have shown that chelates of other related metals such as copper and manganese and that other ligands related to the ethylenedinitrilotetraacetates chemically and structurally can be used as well.

These combinations of the chelates and a trace of bromate may be introduced directly as purified chelates, as reaction mixtures with the salts metathetically formed, in solution in the dough water or dough water solutions with other ingredients. They can be introduced blended with flour, with dough conditioner ingredients and the vitamins used for enrichment. In this case the contribution in enrichment iron is significant. Further, the process of the invention may be performed when the precursors of these chelates, soluble iron salts and the ethylenedinitrilotetraacetates with a fraction of the usual amount of bromate are introduced to a baked product dough by any of these routes.

I claim:

1. A process for the production of yeast leavened baked products of improved volume which comprises incorporating in the dough batch prior to baking an iron chelate of ethylenedinitrilotetraacetic acid or a salt thereof or a combination of an iron salt and ethylenedinitrilotetraacetic acid or a salt thereof which yields such chelate upon solution in the dough water, in an amount effective to improve the volume of the baked product.

2. The process of claim 1 in which the quantity of the iron chelate or the combination producing such chelate incorporated in the dough is such to provide .001% to .02% based on the weight of the flour of such chelate in said dough batch.

3. The process of claim 2 comprising in addition incorporating .003% to .012% based on the weight of the flour of ascorbic acid in said dough batch.

4. A process according to claim 3 for the production of yeast leavened baked products of improved volume using a reduced fermentation time which comprises in addition incorporating in said dough prior to baking an amount of food acid sufficient to provide a normal acidity in the fermented dough equivalent to that developed with a longer fermentation.

5. A process in accordance with claim 4 wherein a potassium bromate in an amount of .0001% to .003% based on the weight of the flour is added to the dough batch.

6. A process in accordance with claim 3 wherein potassium bromate in an amount of .0001% to .003% based on the weight of the flour is added to the dough batch.

7. A process in accordance with claim 1 wherein bromate salt in an amount of .0001% to .003% based on the weight of the flour is added to the dough batch.

8. A process in accordance with claim 1 wherein potassium bromate in an amount of .0001% to .003% based on the weight of the flour is added to the dough batch.

9. A flour composition for the preparation of yeast leavened baked products comprising flour in intimate admixture with an iron chelate of ethylenedinitrilotetraacetic acid or a salt thereof or a combination of an iron salt and ethylenedinitrilotetraacetic acid or a salt thereof which yields such chelate upon solution in water, the amount of said chelate or materials producing same being such as to provide .001% to .02% of said chelate based on the weight of the flour.

10. A flour composition according to claim 9 comprising in addition an intimate admixture with said flour of .003% to .012% of ascorbic acid based upon the weight of the flour.

11. A flour composition in accordance with claim 10 wherein potassium bromate in an amount of .0001% to .003% based on the weight of the flour is present therein.

12. A flour composition in accordance with claim 9 wherein potassium bromate in an amount of .0001% to .003% based on the weight of the flour is present therein.

13. A dough conditioner for use in the production of yeast leavened baked products comprising a dry mix of (A)(1) an iron chelate of ethylenedinitrilotetraacetic acid or a salt thereof or (2) a combination of an iron salt and ethylenedinitrilotetraacetic acid or a salt thereof which yields such chelate upon solution in water, and (B) ascorbic acid, the quantity of (A) and (B) in such mix being such that when incorporated in the dough used for the production of the baked product to provide .001% to .02% of said iron chelate in said dough based on the weight of the flour will also provide .003% to .012% of ascorbic acid in said dough.

14. A dough conditioner dry mix according to claim 13 for use in the production of yeast leavened baked products using a reduced fermentation time comprising in addition a quantity of food acid sufficient to provide a normal acidity in the fermented dough equivalent to that developed with a longer fermentation time when said mix is incorporated at the prescribed level.

15. A dough conditioner in accordance with claim 14 wherein potassium bromate in an amount of .0001% to .003% based on the weight of the flour is present therein.

16. A dough conditioner in accordance with claim 13 wherein potassium bromate in an amount of .0001% to .003% based on the weight of the flour is present therein.

17. A dough conditioner suitable for use in the production of yeast leavened baked products comprising a dry mix of (A)(1) an iron chelate of ethylenedinitrilotetraacetic acid or a salt thereof or (2) a combination of an iron salt and ethylenedinitrilotetraacetic acid or a salt thereof which yields such chelate upon solution in water, (B) a source of calcium ions and (C) a source of ammonium ions, the quantity of (A), (B), and (C) in such mix being such that when incorporated in the dough used for the production of the baked product to provide .001% to .02% of said iron chelate in said dough based on the weight of the flour will also provide between 50 and 100 moles of calcium and ammonium ions for each mole of iron contained in said chelate.

18. A dough conditioner in accordance with claim 17 wherein potassium bromate in an amount of .0001% to .003% based on the weight of the flour is present therein.

References Cited
UNITED STATES PATENTS

| | | | |
|---|---|---|---|
| 1,913,044 | 6/1933 | Sasse | 99—91 |
| 2,470,804 | 5/1949 | Clark | 99—91 X |

RAYMOND N. JONES, Primary Examiner

J. R. HOFFMAN, Assistant Examiner

U.S. Cl. X.R.

426—152, 208, 226